United States Patent
Boday et al.

(10) Patent No.: US 9,284,414 B2
(45) Date of Patent: Mar. 15, 2016

(54) FLAME RETARDANT POLYMERS CONTAINING RENEWABLE CONTENT

(71) Applicant: GLOBALFOUNDRIES INC., Grand Cayman (KY)

(72) Inventors: Dylan J. Boday, Tucson, AZ (US); Joseph Kuczynski, North Port, FL (US); Timothy C. Mauldin, Tucson, AZ (US)

(73) Assignee: GLOBALFOUNDRIES INC., Grand Cayman (KY)

(*) Notice: Subject to any disclaimer, the term of this patent is extended or adjusted under 35 U.S.C. 154(b) by 46 days.

(21) Appl. No.: 14/090,172

(22) Filed: Nov. 26, 2013

(65) Prior Publication Data

US 2015/0148519 A1    May 28, 2015

(51) Int. Cl.
*C08G 79/04*    (2006.01)
*C08G 79/02*    (2006.01)

(52) U.S. Cl.
CPC ............... *C08G 79/04* (2013.01); *C08G 79/02* (2013.01)

(58) Field of Classification Search
CPC ................................. C08G 79/02; C08G 79/04
USPC ........................................... 528/40, 400, 398
See application file for complete search history.

(56) References Cited

U.S. PATENT DOCUMENTS

| | | | |
|---|---|---|---|
| 2010/0168299 | A1 | 7/2010 | Tanaka et al. |
| 2011/0223206 | A1 | 9/2011 | Lebouille et al. |
| 2011/0288207 | A1 | 11/2011 | Aoshima et al. |
| 2011/0301266 | A1 | 12/2011 | Yamanaka et al. |
| 2012/0238652 | A1 | 9/2012 | Uehara et al. |
| 2012/0252911 | A1 | 10/2012 | Fleckenstein et al. |
| 2013/0005872 | A1 | 1/2013 | Kiuchi et al. |

FOREIGN PATENT DOCUMENTS

| | | |
|---|---|---|
| CN | 101879739 A | 11/2010 |
| CN | 102585141 A | 7/2012 |
| CN | 102585143 A | 7/2012 |
| CN | 102585293 A | 7/2012 |
| EP | 1741707 A1 | 1/2007 |
| EP | 2327742 A2 | 6/2011 |
| EP | 2118187 B1 | 9/2012 |
| JP | 2008303288 A | 12/2008 |

(Continued)

OTHER PUBLICATIONS

U.S. Appl. No. 14/090,022 claims.*

(Continued)

*Primary Examiner* — Duc Truong
(74) *Attorney, Agent, or Firm* — Yuanmin Cai; Andrew M. Calderon; Roberts Mlotkowski Safran & Cole, P.C.

(57) ABSTRACT

A flame retardant polymer is prepared from renewable content. In an exemplary synthetic method, a bio-derived flame retardant polymer is prepared by a polycondensation reaction of a biobased diol (e.g., isosorbide) and a phosphorus-containing monomer (e.g., phenylphosphonic dichloride). The biobased diol may be obtained either directly from, or through modification of, a biological product. Preferably, at least 50% of the mass of the biobased diol is obtained directly from a biological product. The phosphorus-containing monomer may be a phosphonic dichloride, dichlorophosphate, alkyl/aryl phosphonate, or other phosphorus-containing monomer known for flame retardancy.

13 Claims, 2 Drawing Sheets

(56) References Cited

FOREIGN PATENT DOCUMENTS

| | | | |
|---|---|---|---|
| JP | 2009138138 | A | 6/2009 |
| JP | 2009227784 | A | 10/2009 |
| JP | 2009235422 | A | 10/2009 |
| JP | 2010111739 | A | 5/2010 |
| JP | 2011207967 | A | 10/2011 |
| JP | 2013006911 | A | 1/2013 |
| WO | 2011083009 | A1 | 7/2011 |
| WO | WO2012129464 | A2 | 9/2012 |

OTHER PUBLICATIONS

Fleckenstein et al; Organic Phosphorus Compounds for Fire Retardants for Plastic Foams; 2011; BASF SE Germany; Chem Abstract 155:153680.*

Liu et al., "Design, Synthesis, and Application of Novel Flame Retardants Derived From Biomass", BioResources, vol. 7, No. 4, 2012, pp. 4914-4925.

"Biobased monomers set new trends in wood coatings and fire retardants", European Coatings, Jul. 3, 2012, 2 pages.

Bart A. J. Noordover, "Biobased step-growth polymers—chemistry, functionality and applicability", Technische Universiteit Eindhoven, 2007, 210 pages.

U.S. Appl. No. 14/090,022, to Boday et al., entitled "Flame Retardant Block Copolymers from Renewable Feeds", filed Nov. 2013, assigned to International Business Machines Corporation.

U.S. Appl. No. 14/090,022, to Boday et al., entitled "Flame Retardant Block Copolymers from Renewable Feeds", filed Nov. 26, 2013, assigned to International Business Machines Corporation.

U.S. Appl. No. 14/696,517, to Boday et al., entitled "Flame Retardant Polymers Containing Renewable Content", filed Apr. 27, 2015, assigned to International Business Machines Corporation.

U.S. Appl. No. 14/697,665, to Boday et al., entitled "Flame Retardant Polymers Containing Renewable Content", filed Apr. 28, 2015, assigned to International Business Machines Corporation.

* cited by examiner

FLAME RETARDANT POLYMERS CONTAINING RENEWABLE CONTENT

BACKGROUND

The present invention relates in general to the field of flame retardancy. More particularly, the present invention relates to flame retardant polymers prepared from renewable feedstock.

SUMMARY

In accordance with some embodiments of the present invention, a flame retardant polymer is prepared from renewable content. In an exemplary synthetic method, a bio-derived flame retardant polymer is prepared by a polycondensation reaction of a biobased diol (e.g., isosorbide) and a phosphorus-containing monomer (e.g., phenylphosphonic dichloride). The biobased diol may be obtained either directly from, or through modification of, a biological product. Preferably, at least 50% of the mass of the biobased diol is obtained directly from a biological product. More preferably, the entire mass of the biobased diol is obtained directly from a biological product. The phosphorus-containing monomer may be a phosphonic dichloride, dichlorophosphate, alkyl/aryl phosphonate, or other phosphorus-containing monomer known for flame retardancy (e.g., a phosphinate, a phosphonate, a phosphate ester, and combinations thereof).

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
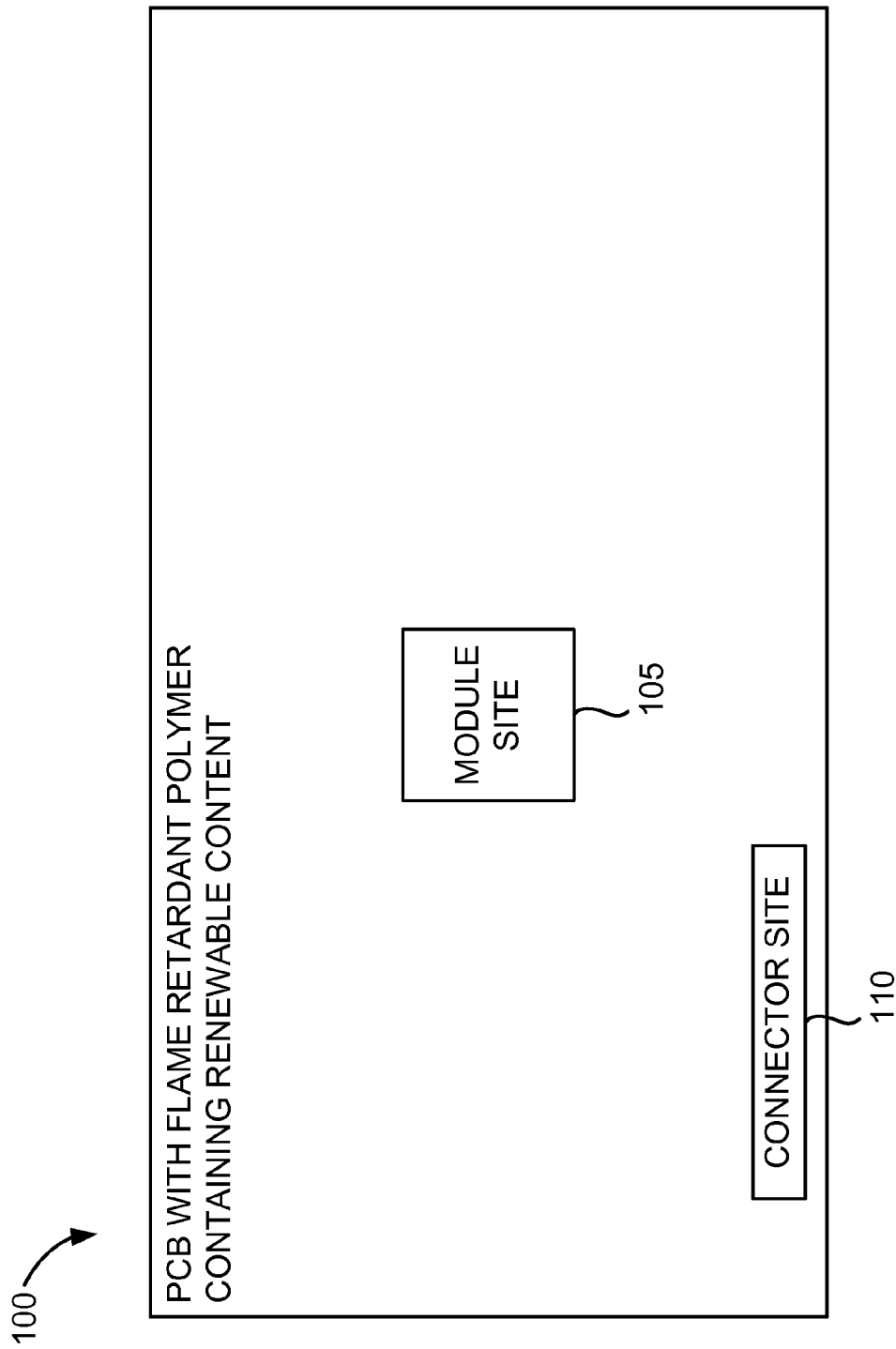
FIG. 1 is a block diagram illustrating an exemplary printed circuit board (PCB) having layers of dielectric material that incorporate a bio-derived flame retardant polymer in accordance with some embodiments of the present invention.

The use of synthetic polymers from petroleum sources is widespread. Petroleum-derived synthetic polymers can be found in nearly every item we use in our daily lives. There is a growing shift to prepare polymeric materials from renewable feedstock because petroleum is a finite resource. The use of these renewable polymers is envisaged in applications from disposable products to durable goods. However, significant challenges must be overcome before renewable polymers find wide spread use. One of the main challenges facing renewable polymers is flame retardancy. Known renewable polymers and polymer blends containing renewable polymers typically do not retard burning. A common approach to render renewable polymers and blends containing renewable polymers as flame retardant is to incorporate flame retardant additives such as halogenated or phosphorus-containing materials. These flame retardant additives are typically small molecules and are in the form of particles. Necessary loadings of these flame retardant additives can run as high as 30%, thus compromising the mechanical properties of the resulting composite materials.

Traditional renewable materials, such as vegetable oils, fatty acids, starch, cellulose and natural rubber, have been available for decades. More recently, a new class of biobased starting compounds has become available. For example, isosorbide, which is a biobased monomer obtained from starch extracted from corn (or other starch source), is commercially available from suppliers and agricultural processors such as Archer Daniels Midland Company (ADM). Large scale availability of additional biobased monomers through improved production processes, as well as the development of a biobased product infrastructure, will accelerate the shift toward the use of renewable feedstock.

Isosorbide (IS) is a so-called 1,4:3,6-dianhydrohexitol (DAH). More generally, 1,4:3,6-dianhydrohexitols (DAHs) include: 1:4:3,6-dianhydro-D-glucitol (isosorbide, IS); 1,4:3,6-dianhydro-L-iditol (isoidide, II); and 1,4:3,6-dihydro-D-mannitol (isomannide, IM).

Isosorbide (IS) has the following molecular structure:

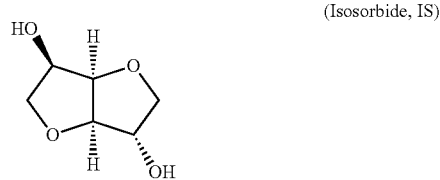

Isoidide (II) has the following molecular structure:

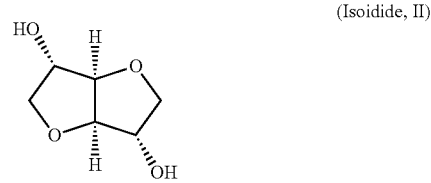

Isomannide (IM) has the following molecular structure:

Each of the DAHs can be obtained from biomass. Isosorbide (IS) is currently the most widely commercially available DAH.

In addition to DAHs, many other monomers can be obtained from biomass. Such renewable monomers include 2,5-bis(hydroxymethyl)furan, ethylene glycol, propylene glycol (also referred to as "1,2-propanediol"), 1,3-propanediol, glycerol (also referred to as "glycerin" and "glycerine"), 2,3-butanediol, lactic acid, succinic acid, citric acid, levulinic acid, lactide, and ethanol. Among the monomers that can be obtained from biomass are biobased diols (e.g., DAHs, 2,5-bis(hydroxymethyl)furan, ethylene glycol, propylene glycol, 1,3-propanediol, glycerol, and 2,3-butanediol), any one of which may be employed as a reactant in accordance with some embodiments of the present invention.

For purposes of this document, including the claims, the term "biobased" refers to chemicals, energy sources and other materials that utilize biological or renewable agricultural material. Also, for purposes of this document, including the claims, the term "renewable" refers to a chemical, energy source or other material that is inexhaustible or rapidly replaceable by new growth. Also, for purposes of this document, including the claims, the term "biomass" refers to a biological material derived from living, or recently living organisms.

In the manufacture of PCBs, connectors, electronic device plastic enclosures and plastic enclosure panels, and other articles of manufacture that employ thermosetting plastics (also known as "thermosets") or thermoplastics, incorporation of a flame retardant is required for ignition resistance. Typically, brominated organic compounds impart flame retardancy. Consequently, the base material (e.g., epoxy resin for PCBs, and liquid crystal polymer (LCP) for connectors, and acrylonitrile butadiene styrene (ABS) for electronic device plastic panels and plastic enclosure panels) properties are compromised because a relatively large quantity of a flame retardant is necessary to achieve the desired ignition resistance.

In accordance with some embodiments of the present invention, a flame retardant polymer is prepared from renewable content. The resulting bio-derived flame retardant polymer may be used alone or blended with one or more other polymers to impart flame retardancy to manufactured articles such as printed circuit boards (PCBs), connectors, electronic device plastic enclosures and plastic enclosure panels, and other articles of manufacture that employ thermosetting plastics or thermoplastics. In an exemplary synthetic method, a bio-derived flame retardant polymer is prepared by a polycondensation reaction of a biobased diol (e.g., isosorbide) and a phosphorus-containing monomer (e.g., phenylphosphonic dichloride). The biobased diol may be obtained either directly from, or through modification of, a biological product. Preferably, at least 50% of the mass of the biobased diol is obtained directly from a biological product. More preferably, the entire mass of the biobased diol is obtained directly from a biological product. The phosphorus-containing monomer may be a phosphonic dichloride, dichlorophosphate, alkyl/aryl phosphonate, or other phosphorus-containing monomer known for flame retardancy (e.g., a phosphinate, a phosphonate, a phosphate ester, and combinations thereof).

In accordance with some embodiments of the present invention, flame retardant moieties are incorporated directly into the renewable polymer backbones. Condensation polymerization of a biobased diol such as isosorbide and a phosphorus-containing monomer such as phenylphosphonic dichloride, for example, incorporates flame retardant moieties (i.e., phosphorus) directly into the backbone of the resulting bio-derived flame retardant polymer. The resulting homogeneous and uniform incorporation of phosphorus yields flame retardant bio-derived polymers without the need for discrete particles (i.e., conventional flame retardant additives) that often come with the caveat of diminished mechanical toughness, stiffness, etc. Additionally, because these bio-derived flame retardants are polymers and not small molecules (conventional flame retardant additives typically are small molecules), the mechanical properties of the composite will not be compromised.

In accordance with some embodiments of the present invention, bio-derived flame retardant polymers may be used by alone or blended with other polymers. For example, a bio-derived flame retardant polymer in accordance with some embodiments of the present invention may be blended with one or more petroleum-derived polymers (e.g., acrylonitrile butadiene styrene (ABS)) and/or one or more conventional bio-derived polymers (e.g., polylactic acid (PLA), polyhydroxybutyrate (PHB), and the like). For example, a bio-derived flame retardant polymer formed by condensation polymerization of a biobased diol (e.g., isosorbide) and a phosphorus-containing monomer (e.g., phenylphosphonic dichloride) in accordance with some embodiments of the present invention may be blended with a renewable-based composite polymer, such as a mixture of polyhydroxybutyrate (PHB) bioplastic and carbon dioxide-based polypropylene carbonate (PPC) (containing 43% by weigh $CO_2$), which is a renewable-based composite polymer alternative for ABS developed by Siemens.

Alternatively, in accordance with other embodiments of the present invention, bio-derived flame retardant polymers may be used as flame retardant additives (i.e., discrete particles) in composite materials. For example, a bio-derived flame retardant polymer formed by condensation polymerization of a biobased diol (e.g., isosorbide) and a phosphorus-containing monomer (e.g., phenylphosphonic dichloride) may be ground to particles that may serve as a flame retardant additive in a composite material. These bio-derived flame retardant polymer particles may also serve to increase the renewable content in the composite material as compared to conventional flame retardant additives that lack renewable content.

An exemplary printed circuit board (PCB) implementation of the present invention is described below with reference to FIG. 1, while an exemplary connector implementation and an exemplary plastic enclosure panel implementation of the present invention are described below with reference to FIG. 2. However, those skilled in the art will appreciate that the present invention applies equally to any manufactured article that employs thermosetting plastics (also known as "thermosets") or thermoplastics.

As described below, a bio-derived flame retardant polymer in accordance with some embodiments of the present invention may be synthesized by, for example, a polycondensation reaction in the melt of a biobased diol and a phosphorus-containing monomer. This first pathway to prepare a bio-derived flame retardant polymer in accordance with some embodiments of the present invention is exemplified by reaction scheme 1, below.

However, those skilled in the art will appreciate that a bio-derived flame retardant polymer in accordance with some embodiments of present invention may be synthesized using other processes and reaction schemes. For example, a bio-derived flame retardant polymer in accordance with some embodiments of the present invention may be synthesized by, for example, a polycondensation reaction in solution of a biobased diol and a phosphorus-containing monomer. This second pathway to prepare a bio-derived flame retardant polymer in accordance with some embodiments of the present invention is exemplified by reaction scheme 2, below.

Once the polycondensation reaction of either the first or second pathway is complete, conventional follow-on processing may be used in accordance with some embodiments of the present invention to refine the bio-based flame retardant polymer obtained from the polycondensation reaction. The resulting refined bio-based flame retardant polymer may be used alone or blended with one or more other polymers to impart flame retardancy to manufactured articles. Typically, if the first pathway (melt-based) is used, the bio-derived flame retardant polymer obtained from the polycondensation reaction in the melt is washed and dried. Typically, if the second pathway (solution-based) is used, the organic-based solvent used in the polycondensation reaction is removed after the polycondensation reaction is complete. The bio-derived flame retardant polymer is then washed and dried.

Alternatively, once the polycondensation reaction of either the first or second pathway is complete, particles of a bio-derived flame retardant polymer in accordance with some embodiments of the present invention may be produced using conventional follow-on processing. These particles may serve as a flame retardant additive in a composite material. Typically, if the first pathway (melt-based) is used, the bio-derived flame retardant polymer obtained from the polycondensation reaction in the melt is washed, dried and crushed into particles. Typically, if the second pathway (solution-based) is used, the organic-based solvent used in the polycondensation reaction is removed after the polycondensation reaction is complete. The bio-derived flame retardant polymer is then washed and dried, and crushed into particles. In terms of size, the particles of bio-derived flame retardant polymer may be course particles, fine particles, ultrafine particles, or nanoparticles.

The first pathway is exemplified below in the non-limiting reaction scheme (i.e., reaction scheme 1). A reaction scheme (reaction scheme 1) follows for synthesizing a bio-derived flame retardant polymer through a melt-based condensation polymerization of a biobased diol and a phosphorous-containing monomer in accordance with some embodiments of the present invention. In reaction scheme 1, isosorbide and phenylphosphonic dichloride are reacted via condensation polymerization in a melt state.

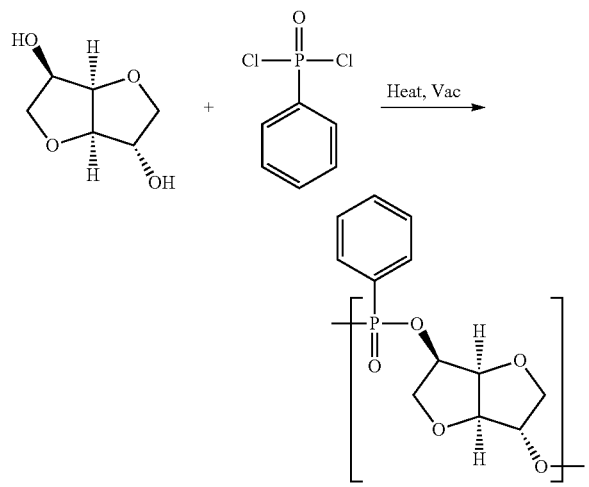

(Reaction Scheme 1)

In reaction scheme 1, a bio-derived flame retardant polymer is synthesized through a melt polycondensation reaction of isosorbide and phenylphosphonic dichloride using conventional procedures well known to those skilled in the art. Reaction scheme 1 may be performed at 150° C. while stirring under a vacuum (e.g., 1-5 mbar) for several hours (e.g., 4 hours). Generally, stoichiometric quantities of the reactants may be used.

Melt polycondensation techniques are well known in the art. For example, a thesis by Bart A. J. Noordover, "Biobased step-growth polymers—chemistry, functionality and applicability", Technische Universiteit Eindhoven, 2007, discloses melt polycondensation techniques in the context of synthesizing biobased step-growth polymers for a thermosetting powder coatings. The Noordover thesis is hereby incorporated herein by reference in its entirety.

Optionally, an inert gas (e.g., $N_2$) may be flowed through the reactor to limit oxidation and facilitate removal of HCl vapor formed during the reaction.

Also, a catalyst dissolved in a solvent may be optionally added to the melt. For example, tin(II) 2-ethylhexanoate (also referred to as "Sn(Oct)$_2$") or titanium(IV) n-butoxide (0.02 mol % relative to phenylphosphonic dichloride), dissolved in toluene, may be added to the melt. Zinc(II) and titanium(IV) catalysts may also be used, as well as organic catalysts, such as 4-dimethylaminopyridine (DMAP), 1,8-Diazabicyclo [5.4.0]undec-7-ene (DBU) and triazabicyclodecene (TBD).

Isosorbide is a commercially available biobased diol. As mentioned above, isosorbide is a biobased monomer obtained from starch extracted from corn (or other starch source). Isosorbide, which is a solid at room temperature, is well suited for melt polycondensation reactions. Isosorbide has a melting point temperature between 60 and 63° C., and is stable up to 270° C. In addition, isosorbide is hygroscopic.

Phenylphosphonic dichloride is a commercially available phosphorus-containing monomer. Phenylphosphonic dichloride is a liquid at room temperature. Phenylphosphonic dichloride has a melting temperature of 3° C., and has a boiling temperature of 258° C.

Typically, after the melt polycondensation reaction is complete, the bio-derived flame resistant polymer is removed from the reactor, washed and dried. For example, the reaction product may be precipitated into an appropriate non-solvent (e.g., methanol) and washed with non-solvent. The reaction product may then be dried under vacuum for twenty-four hours at room temperature. Optionally, the reaction product may now be crushed into particles, and re-dried under vacuum. The resultant particles may be course particles, fine particles, ultrafine particles, or nanoparticles.

Those skilled in the art will appreciate that reaction scheme 1 is set forth for the purpose of illustration not limitation. For example, reaction scheme 1 synthesizes a particular bio-derived flame retardant polymer by a melt polycondensation reaction of a particular biobased diol (isosorbide) and a particular phosphorus-containing monomer (phenylphosphonic dichloride). This particular synthesis of this particular bio-derived flame retardant polymer is exemplary. In general, a bio-derived flame retardant polymer in accordance with some embodiments of the present invention may be synthesized using a polycondensation reaction in the melt or in solution of any suitable biobased diol and any suitable phosphorus-containing monomer.

The second pathway is exemplified below in another non-limiting reaction scheme (i.e., reaction scheme 2). A reaction scheme (reaction scheme 2) follows for synthesizing a bio-derived flame retardant polymer through a solution-based condensation polymerization of a biobased diol and a phosphorus-containing monomer in accordance with some embodiments of the present invention. In reaction scheme 2, isosorbide and phenylphosphonic dichloride are reacted via condensation polymerization in solution.

(Reaction Scheme 2)

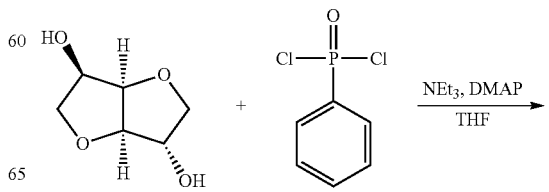

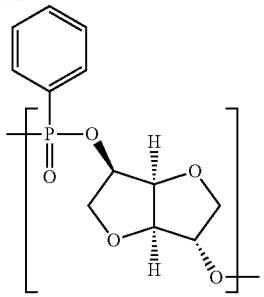

In reaction scheme 2, a bio-derived flame retardant polymer is synthesized through a solution-based polycondensation reaction of isosorbide and phenylphosphonic dichloride at room temperature (e.g., 25° C.) for several hours (e.g., 2 to 3 hours) using conventional procedures well known in the art. Isosorbide is reacted with phenylphosphonic dichloride in the presence of triethylamine (NEt$_3$) (also referred to as "Et$_3$N", "TEA" and "N,N-diethylethanamine"), 4-dimethylaminopyridine (DMAP), and tetrahydrofuran (THF) to form the bio-derived flame retardant polymer. NEt$_3$ and DMAP are catalysts. THF is the solvent. Generally, stoichiometric quantities of the reactants may be used.

Isosorbide is a commercially available biobased diol. As mentioned above, isosorbide is a biobased monomer obtained from starch extracted from corn (or other starch source). Isosorbide is a solid at room temperature.

Phenylphosphonic dichloride is a commercially available phosphorus-containing monomer. Phenylphosphonic dichloride is a liquid at room temperature.

NEt$_3$ and DMAP are commercially available organic catalysts. One skilled in the art will appreciate that any suitable catalyst (proton acceptor) may be used in lieu of, or in addition to, NEt$_3$ and DMAP. For example, tri-n-butylamine (TBA) is also a suitable catalyst.

THF is a commercially available solvent. One skilled in the art will appreciate that any suitable solvent may be used in lieu of, or in addition to, THF. The choice of solvent is not critical as long as the monomers are soluble in the solvent. It is vital, however, that the solvent not be alcoholic in nature to prevent unwanted side reactions of reagents with the solvent. Acceptable solvents include, but are not limited to, ether and polar aprotic solvents. The following solvents are the most common: tetrahydrofuran, dimethylformamide, and acetonitrile. Further various other hydrocarbons solvents in which the monomers are miscible may be used as cosolvents. One example of such a cosolvent is benzene. Which solvent is preferred depends on the solubility of the subject monomers. In many cases, the preferred solvent is tetrahydrofuran.

Solution-based polycondensation techniques are well known in the art. For example, an article by Yan Liu et al., "DESIGN, SYNTHESIS, AND APPLICATION OF NOVEL FLAME RETARDANTS DERIVED FROM BIOMASS", BioResources, Vol. 7, No. 4, 2012, pp. 4914-4925, discloses solution-based polycondensation techniques in the context of flame retardants. The Liu et al. article is hereby incorporated herein by reference in its entirety.

Precipitation into an appropriate non-solvent (e.g., methanol) is used for product isolation (i.e., to remove the reaction product from the solvent).

After the solvent is removed, the reaction product is then washed and dried. For example, the reaction product may be washed with non-solvent and then dried under vacuum for twenty-four hours at room temperature. Optionally, the reaction product may now be crushed into particles, and re-dried under vacuum. The resultant particles may be course particles, fine particles, ultrafine particles, or nanoparticles.

Those skilled in the art will appreciate that reaction scheme 2 is set forth for the purpose of illustration not limitation. For example, reaction scheme 2 synthesizes a particular bio-derived flame retardant polymer by a solution-based polycondensation reaction of a particular biobased diol (isosorbide) and a particular phosphorus-containing monomer (phenylphosphonic dichloride). This particular synthesis of this particular bio-derived flame retardant polymer is exemplary. In general, a bio-derived flame retardant polymer in accordance with some embodiments of the present invention may be synthesized using a polycondensation reaction in the melt or in solution of any suitable biobased diol and any suitable phosphorus-containing monomer.

Biobased diols suitable for reacting with a phosphorus-containing monomer via a polycondensation reaction to produce a bio-derived flame retardant polymer in accordance with some embodiments of the present invention may be either obtained commercially or synthesized. For example, suitable biobased diols that may be obtained commercially include, but are not limited to, isosorbide (as well as the other DAHs), 2,5-bis(hydroxymethyl)furan, ethylene glycol, propylene glycol (also referred to as "1,2-propanediol"), 1,3-propanediol, glycerol (also referred to as "glycerin" and "glycerine"), 2,3-butanediol, and combinations thereof. Each of these diols can be obtained from biomass. Preferably, at least 50% of the mass of the biobased diol is obtained directly from a biological product. More preferably, the entire mass of the biobased diol is obtained directly from a biological product.

Phosphorus-containing monomers suitable for reacting with a biobased diol via a polycondensation reaction to produce a bio-derived flame retardant polymer in accordance with some embodiments of the present invention may be either obtained commercially or synthesized. For example, suitable phosphorus-containing monomers that may be obtained commercially include, but are not limited to, phenylphosphonic dichloride, ethylphosphonic dichloride, methylphosphonic dichloride, methylenebis(phosphonic dichloride), phenyl dichlorophosphate (PDCP), ethyl dichlorophosphate, and methyl dichlorophosphate. Generally, suitable phosphorus-containing monomers include, but are not limited to, phosphonic dichlorides, dichlorophosphates, alkyl/aryl phosphonates, or other phosphorus-containing monomers known for flame retardancy (e.g., phosphinates, phosphonates, phosphate esters, and combinations thereof).

Phosphonic dichlorides and dichlorophosphates are listed among the suitable phosphorus-containing monomers for purposes of illustration, not limitation. Suitable phosphorus-containing monomers may alternatively contain other halogen atoms or hydrogen atoms that participate in the polycondensation reaction in lieu of chlorine atoms.

Suitable phosphorus-containing monomers also include (or may be synthesized from) conventional phosphorus-based flame retardants, such as phosphonates (e.g., dimethyl methyl phosphonate; diethyl ethyl phosphonate; dimethyl propyl phosphonate; diethyl N,N-bis(2-hydroxyethyl)amino methyl phosphonate; phosphonic acid, methyl(5-methyl-2-methyl-1,3,2-dioxaphosphorinan-5-y) ester, P,P'-dioxide; and phosphonic acid, methyl(5-methyl-2-methyl-1,3,2-dioxaphosphorinan-5-yl)methyl, methyl ester, P-oxide), phosphate esters (e.g., triethyl phosphate; tributyl phosphate; trioctyl phosphate; and tributoxyethyl phosphate), and phosphinates.

A conventional phosphorus-based flame retardant typically includes one or more of a phosphonate, a phosphate ester, or a phosphinate. Conventional phosphorus-based flame retardants that are phosphonates have the following generic molecular structure:

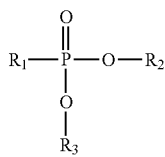

where $R_1$, $R_2$ and $R_3$ are organic substituents (e.g., alkyl, aryl, etc.) that may be the same or different.

Conventional phosphorus-based flame retardants that are phosphate esters have the following generic molecular structure:

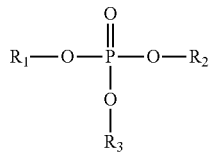

where $R_1$, $R_2$ and $R_3$ are organic substituents (e.g., alkyl, aryl, etc.) that may be the same or different.

Conventional phosphorus-based flame retardants that are phosphinates have the following generic molecular structure:

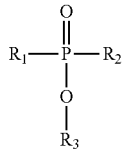

where $R_1$, $R_2$ and $R_3$ are organic substituents (e.g., alkyl, aryl, etc.) that may be the same or different.

One or more of the above conventional phosphorus-based flame retardants (i.e., phosphonate, phosphate ester, and/or phosphinate) and/or other conventional phosphate-based flame retardants may be functionalized (e.g., halogenated) using procedures well known to those skilled in the art to produce functionalized phosphorus-containing monomers suitable for reacting with a biobased diol via a polycondensation reaction to produce a bio-derived flame retardant polymer in accordance with some embodiments of the present invention. Hence, either halogen atoms of functionalized phosphorus-containing monomers or hydrogen atoms of the conventional phosphorus-based flame retardants may participate in the polycondensation reaction.

FIG. 1 is a block diagram illustrating an exemplary printed circuit board (PCB) 100 having layers of dielectric material that incorporate a bio-derived flame retardant polymer in accordance with some embodiments of the present invention. In the embodiment illustrated in FIG. 1, the PCB 100 includes one or more module sites 105 and one or more connector sites 110. The configuration of the PCB 100 shown in FIG. 1 is for purposes of illustration and not limitation.

Figure 2:
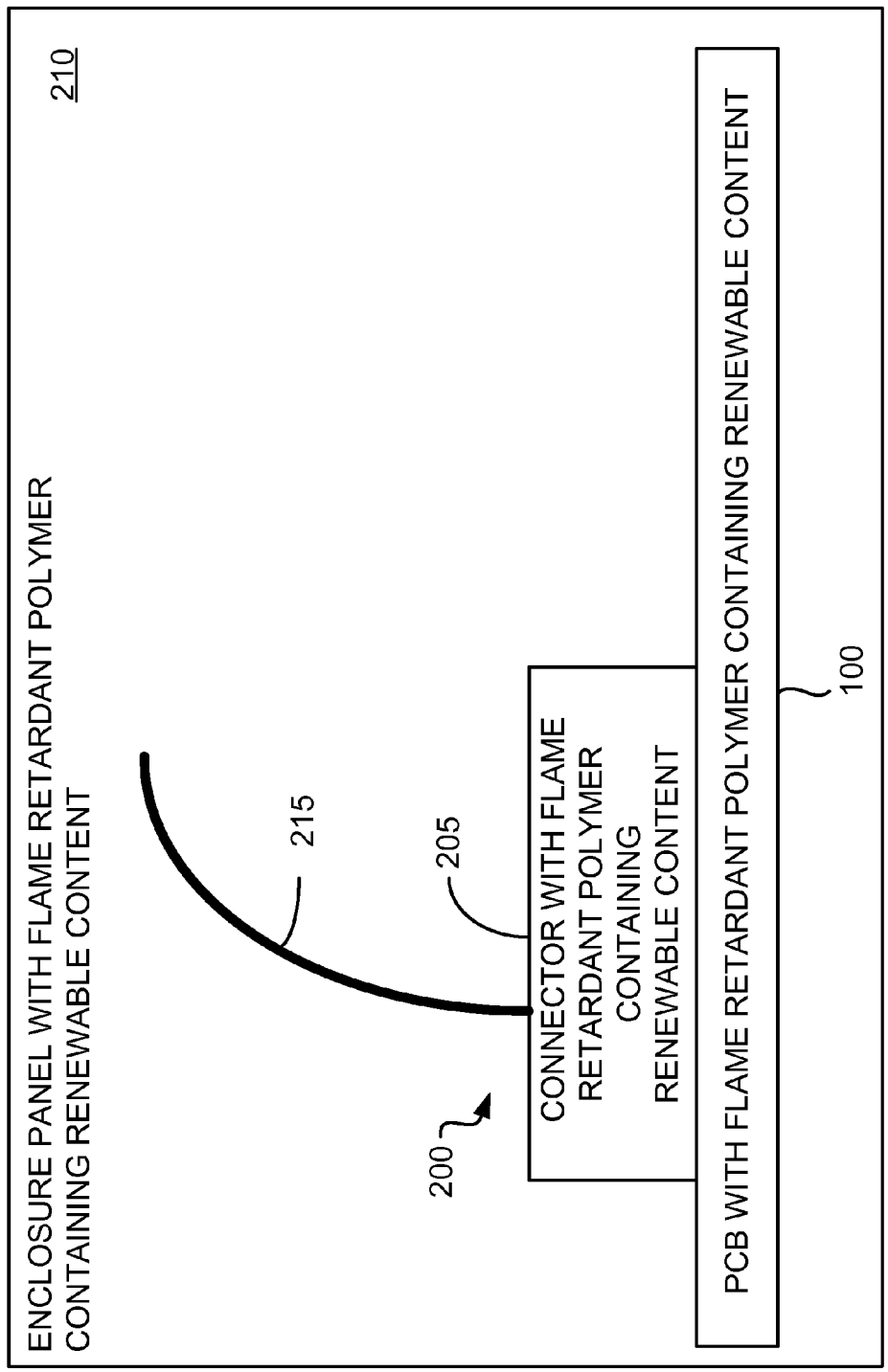
FIG. 2 is a block diagram illustrating an exemplary connector having a plastic housing and an exemplary plastic enclosure panel each of which incorporates a bio-derived flame retardant polymer in accordance with some embodiments of the present invention.

FIG. 2 is a block diagram illustrating an exemplary connector 200 having a plastic housing 205 and an exemplary plastic enclosure panel 210 that incorporate a bio-derived flame retardant polymer in accordance with some embodiments of the present invention. In the embodiment illustrated in FIG. 2, the connector 200 is configured to make electrical contact with the connector site 110 (shown in FIG. 1) of the PCB 100. Also in the embodiment illustrated in FIG. 2, the connector 200 includes a cable 215. The configuration of the connector 200 and the configuration of the plastic enclosure panel 210 shown in FIG. 2 are for purposes of illustration and not limitation.

In accordance with some embodiments of the present invention, a bio-derived flame retardant polymer is incorporated into the plastic housing 205 to impart flame retardancy. The bio-derived flame retardant polymer may be blended, for example, with the base material of the plastic housing 205.

In accordance with some embodiments of the present invention, a bio-derived flame retardant polymer is incorporated into the plastic enclosure panel 210 to impart flame retardancy. The bio-derived flame retardant polymer may be blended, for example, with the base material of the plastic enclosure panel 210.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method of making a flame retardant polymer, comprising the steps of:
providing a biobased diol and a phosphorus-containing monomer, wherein at least 50% of the mass of the biobased diol is obtained directly from a biological product, and wherein the phosphorus-containing monomer is selected from a group consisting of phosphonic dichlorides, dichlorophosphates, and combinations thereof;
preparing a polycondensation reaction product of the biobased diol and the phosphorus-containing monomer.

2. The method as recited in claim 1, wherein the biobased diol comprises isosorbide, wherein the phosphorus-containing monomer comprises phenylphosphonic dichloride, and the polycondensation reaction product is represented by the following formula:

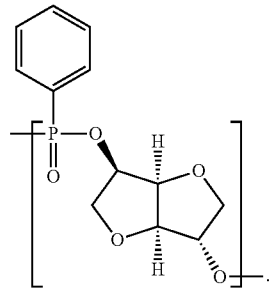

3. The method as recited in claim 1, wherein the biobased diol is selected from a group consisting of a 1,4:3,6-dianhydrohexitol (DAH), 2,5-bis(hydroxymethyl)furan, ethylene glycol, propylene glycol, 1,3-propanediol, glycerol, 2,3-butanediol, and combinations thereof.

4. The method as recited in claim 1, wherein the biobased diol includes isosorbide.

5. The method as recited in claim 1, wherein the phosphorus-containing monomer comprises a phosphonic dichloride.

6. The method as recited in claim 5, wherein the phosphonic dichloride includes phenylphosphonic dichloride.

7. A method of making a flame retardant polymer, comprising the steps of:
providing a biobased diol and a phosphorus-containing monomer, wherein the biobased diol is selected from a group consisting of a 1,4:3,6-dianhydrohexitol (DAH), 2,5-bis(hydroxymethyl)furan, ethylene glycol, propylene glycol, 1,3-propanediol, glycerol, 2,3-butanediol, and combinations thereof, and wherein the phosphorus-containing monomer comprises a phosphonic dichloride;
preparing a polycondensation reaction product of the biobased diol and the phosphorus-containing monomer.

8. The method as recited in claim 7, wherein the biobased diol includes isosorbide.

9. The method as recited in claim 8, wherein the phosphonic dichloride includes phenylphosphonic dichloride.

10. A method of making a flame retardant polymer, comprising the steps of:
providing a biobased diol and a phosphorus-containing monomer, wherein the biobased diol includes isosorbide, and wherein the phosphorus-containing monomer includes phenylphosphonic dichloride;
preparing a polycondensation reaction product of the biobased diol and the phosphorus-containing monomer, wherein the polycondensation reaction product is represented by the following formula:

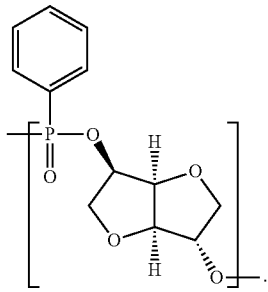

11. The method as recited in claim 1, wherein the step of preparing a polycondensation reaction product of the biobased diol and the phosphorus-containing monomer includes synthesizing the polycondensation reaction product through a melt-based condensation polymerization wherein the biobased diol and the phosphorus-containing monomer are reacted via condensation polymerization in a melt state.

12. The method as recited in claim 7, wherein the step of preparing a polycondensation reaction product of the biobased diol and the phosphorus-containing monomer includes synthesizing the polycondensation reaction product through a melt-based condensation polymerization wherein the biobased diol and the phosphorus-containing monomer are reacted via condensation polymerization in a melt state.

13. The method as recited in claim 10, wherein the step of preparing a polycondensation reaction product of the biobased diol and the phosphorus-containing monomer includes synthesizing the polycondensation reaction product through a melt-based condensation polymerization wherein the biobased diol and the phosphorus-containing monomer are reacted via condensation polymerization in a melt state.

* * * * *